US011640590B2

(12) United States Patent
Stier et al.

(10) Patent No.: US 11,640,590 B2
(45) Date of Patent: May 2, 2023

(54) VENUE MANAGEMENT SYSTEM FOR DURING EVENT PEER-TO-PEER TICKET EXCHANGE

(71) Applicants: Jeffrey W. Stier, New York, NY (US); Michael J. Stier, New York, NY (US); Adam Block, New York, NY (US)

(72) Inventors: Jeffrey W. Stier, New York, NY (US); Michael J. Stier, New York, NY (US); Adam Block, New York, NY (US)

( * ) Notice: Subject to any disclaimer, the term of this patent is extended or adjusted under 35 U.S.C. 154(b) by 0 days.

(21) Appl. No.: 16/513,662

(22) Filed: Jul. 16, 2019

(65) Prior Publication Data
US 2021/0019715 A1  Jan. 21, 2021

(51) Int. Cl.
| | | |
|---|---|---|
| *G06Q 20/04* | (2012.01) | |
| *H04W 4/021* | (2018.01) | |
| *G06Q 10/02* | (2012.01) | |
| *G06Q 20/22* | (2012.01) | |

(52) U.S. Cl.
CPC ........ *G06Q 20/0457* (2013.01); *G06Q 10/02* (2013.01); *G06Q 20/223* (2013.01); *H04W 4/021* (2013.01)

(58) Field of Classification Search
CPC .. G06Q 20/0457; G06Q 20/223; G06Q 10/02; H04W 4/021
USPC .......................................................... 705/41
See application file for complete search history.

(56) References Cited

U.S. PATENT DOCUMENTS

| | | | |
|---|---|---|---|
| 7,899,717 B2* | 3/2011 | Joao ....................... | G06Q 30/00 705/26.41 |
| 10,185,918 B2* | 1/2019 | Joao ....................... | G06Q 10/02 |
| 10,187,609 B2* | 1/2019 | Narasimhan et al. . | H04H 20/71 |
| 2013/0096961 A1* | 4/2013 | Owens et al. ......... | G06Q 10/02 705/5 |
| 2016/0335565 A1* | 11/2016 | Charriere et al. ..... | G06Q 10/02 |
| 2018/0158002 A1* | 6/2018 | Amini .................... | G06Q 10/02 |

OTHER PUBLICATIONS

Old GigaOm, How to use your smartphone to get a better seat during a baseball game, Mar. 13, 2013, Studio Press, gigaom.com (Year: 2013).*
Ryan Lawler, Pogoseat raises $2.3 Million to Offer Discounted Seat Upgrades at Sporting Events, Jul. 28, 2014, techcrunch.com. (Year: 2014).*

* cited by examiner

*Primary Examiner* — Mohammad Z Shaikh
*Assistant Examiner* — George N. Proios
(74) *Attorney, Agent, or Firm* — Gordon Rees Scully Mansukhani LLP

(57) ABSTRACT

Aspects of the present disclosure include an electronic ticket processing system that enables the management of a venue with auction-based, during event, peer-to-peer electronic ticket exchanges. The peer-to-peer during event ticket exchange can be limited by the location of the electronic device of a user and can allow the event attendees enhancement of their experience (e.g. by upgrading their seat location or rights to access). In some embodiments, the during event peer-to-peer ticket exchange can be encouraged or controlled by the venue in accordance to broadcasting aspects, crowd control, analytics, to encourage consumer spending, memberships, and/or other real time updates (e.g. weather, game scores, security concerns).

15 Claims, 16 Drawing Sheets

Welcome to UpClose

Seize a Seat!

The digital marketplace for fan-to-fan, during-event, action-based seat exchange and enhanced experiences.

Go to Venue!

UpClose gives every fan in any seat an equal chance to enhance their experience... by getting UpClose.

Welcome to UpClose

Seize a Seat!

The digital marketplace for fan-to-fan, during-event, action-based seat exchange and enhanced experiences.

You are @ the SoCon Baseball Championship @ AT&T Park, is that Correct?

Yes!

――――― Or ―――――

Welcome to UpClose

Seize a Seat!

The digital marketplace for fan-to-fan, during-event, action-based seat exchange and enhanced experiences.

Please choose who are you?

Buyer

——————— Or ———————

Seller

Welcome to UpClose

Seize a Seat!

The digital marketplace for fan-to-fan, during-event, action-based seat exchange and enhanced experiences.

Please chose who are you?

Buyer

──────── Or ────────

Seller

UpClose is not available now.

This event has not yet started. Go to the venue and sign in after the start time.

VENUE MANAGEMENT SYSTEM FOR DURING EVENT PEER-TO-PEER TICKET EXCHANGE

FIELD OF THE INVENTION

This invention relates to the field of electronic ticket processing and event venue management.

CROSS-REFERENCE TO RELATED APPLICATIONS

[NONE]

BACKGROUND OF THE INVENTION

Event venues have widely adopted electronic ticketing for the sale and distribution of event admission tickets. In this space, a relatively slow evolution of electronic ticketing systems has taken place enabling customers to more securely buy admission tickets prior to an event. Pre-sale codes were then implemented to provide buyers with exclusive access to better seating locations and/or blocked seating areas in accordance with a membership. Further, a ticket buyer has the ability to resell a verified ticket to another buyer prior to the event through an electronic ticket listing agent. Websites that search through ticket agents and compare pricing are also known.

More recently, wireless device technology and new electronic ticketing application players have appeared in the space to provide ticket buyers/users with additional options and functionality for improved venue experiences. For example, U.S. Pat. No. 10,187,609 describes a wireless system used to distribute video content during sporting events in stadiums, arenas, and similar venues using wireless access points. U.S. Pat. Appl. Pub. No. 2013/0096961 A1 describes a system that is said to ensure authenticity eliminating the need to print a ticket to eliminate logistical constraints of venue ticket upgrading/downgrading a ticket during an event. Also, to enhance venue access experience, U.S. Pat. Appl. Pub. No. 2016/0189545 A1 describes systems to manage parking lots around venues in accordance with traffic conditions. U.S. Pat. No. 9,798,984 similarly describes systems that use knowledge about social media contacts of the user to generate dynamic ticket offers, recommendations, or orders, based on that user's information and to manage and order from a venue's concession stands. While the developments are geared towards providing a ticket buyer with a better experience, many shortcomings of these more recent existing systems and processes have prevented wide venue and user adaptation. Accordingly, improved processes and systems are desired. For example:

There is a need for an electronic ticket exchange process and system that can enable effective venue management based on improving event attendees' experiences;

There is a need for an electronic ticket exchange process and system that can enable increased revenue from peer-to-peer transactions;

There is a need for an electronic ticket exchange process and system that can enable the expansion from venue physical boundaries to increase event fan experiences and revenue;

There is a need for an electronic ticket exchange process and system that can enable further improved experiences based on rewards, groups, or memberships;

There is a need for an electronic ticket exchange process and system that can effectively expand admission acquisition times for an event; and There is a need for an electronic ticket exchange process and system that can incorporate geosocial phenomena as part of electronic ticket exchange transactions.

Accordingly, improved solutions for electronic ticket systems and processes that can be practically implemented and overcome the aforementioned needs are desired.

SUMMARY OF THE INVENTION

The foregoing needs are met, to a great extent, by the present invention, wherein in some aspects of embodiments of the invention are intended to address one or more fundamental opportunities to improve and advance existing ticket exchange and venue management solutions. The improved venue management system, for example, by overcoming existing drawbacks and expanding physical barriers of a venue to enable a peer-to-peer ticket exchange after the start of an event while helping manage a venue's seating/access in a practical way.

According to some aspects of the disclosure, a computing device for the management of a venue is disclosed. The computing device can include: communication with a plurality of wireless devices; communication with a venue's seat inventory system; and executable software code for transmitting an event beginning and ending time data, transmitting the event location data and a pre-determined geofenced location area, and processing a seat exchange at a time in between the transmitted beginning and ending time data. In accordance with some aspects, the seat exchange can include a verification including transmitting a location of one or more of the plurality of wireless devices and confirming that the location of the one or more of the plurality of wireless devices is within the pre-determined geofenced location area.

In some embodiments, the seat exchange additionally comprises at least one of a ticket verification and a membership verification. The verification may also include a location of one or more of the plurality of smart phone devices, e.g., as it may be determined by a local area network and/or the global positioning system of one of the plurality of the smart phone devices. For devices outside of the pre-determined geofences area/location range, a view mode only to the seat inventory may be implemented. Wireless devices can include smartphone devices, tablets, smart wearable devices, laptops, and the like.

In accordance with additional aspects of the disclosure, a suggested value for the seat exchange by determining an event's remaining time for the event using the beginning and ending time data can be determined. In some embodiments, the determination may also include a live event update that is received in real time, such as, weather data, a broadcasting camera's location, an event's feedback or score, attendance data, crowd distribution, safety or evacuation procedures, and a news update or any other geosocial phenomena.

In accordance with yet additional aspects of the disclosure, a method for managing a venue is disclosed. The method including: maintaining a venue's seat inventory system for an event; transmitting an event beginning and ending time; transmitting the event location; processing a seat exchange between the beginning and ending time data; verifying a location of one or more a plurality of smart phone devices, and verifying that the location of the one or more of the plurality of smart phone devices is within a pre-determined distance from the event location data. In accordance with some aspects, attendance to an event can be increased by enabling after start of event ticket exchange by a user/venue. In some applications, for example, one seat during an event can be sold several times by the venue for one or more portions of the event.

In accordance with yet additional aspects of the disclosure, the method can also include: maintaining a venue's seat inventory system for an event; transmitting an event's beginning and ending time; transmitting the event location; receiving a location of one or more a plurality of smart phone devices; verifying that the location of the one or more of the plurality of smart phone devices is within a location range; displaying a suggested value determined using one or more of a weather data, a broadcasting camera's location, an event's feedback or score, attendance data, and a news update; and transferring a seat or access to an event's attendee.

A more detailed explanation of the invention and aspects thereof is provided in the following detailed descriptions and appended claims taken in conjunction with the accompanying drawings.

BRIEF DESCRIPTION OF THE DRAWINGS

The accompanying drawings, which are included to provide a further understanding of the invention, are incorporated in and constitute a part of this specification, illustrate embodiments and aspects of the invention and together with the detailed description serve to explain the principles of the invention. Reference will now be made to the accompanying drawings. Like reference numerals may indicate corresponding parts in various drawings. Without limiting the range of possible configurations/applications, the foregoing and other features or aspects of the present disclosure will be more readily apparent from the following detailed description and drawings of exemplary illustrative embodiments of the in invention in which:

FIGS. 7A-7L illustrate exemplary user interface displays for the peer-to-peer during event ticket purchase in accordance with aspects of the disclosure.

Figure 1:
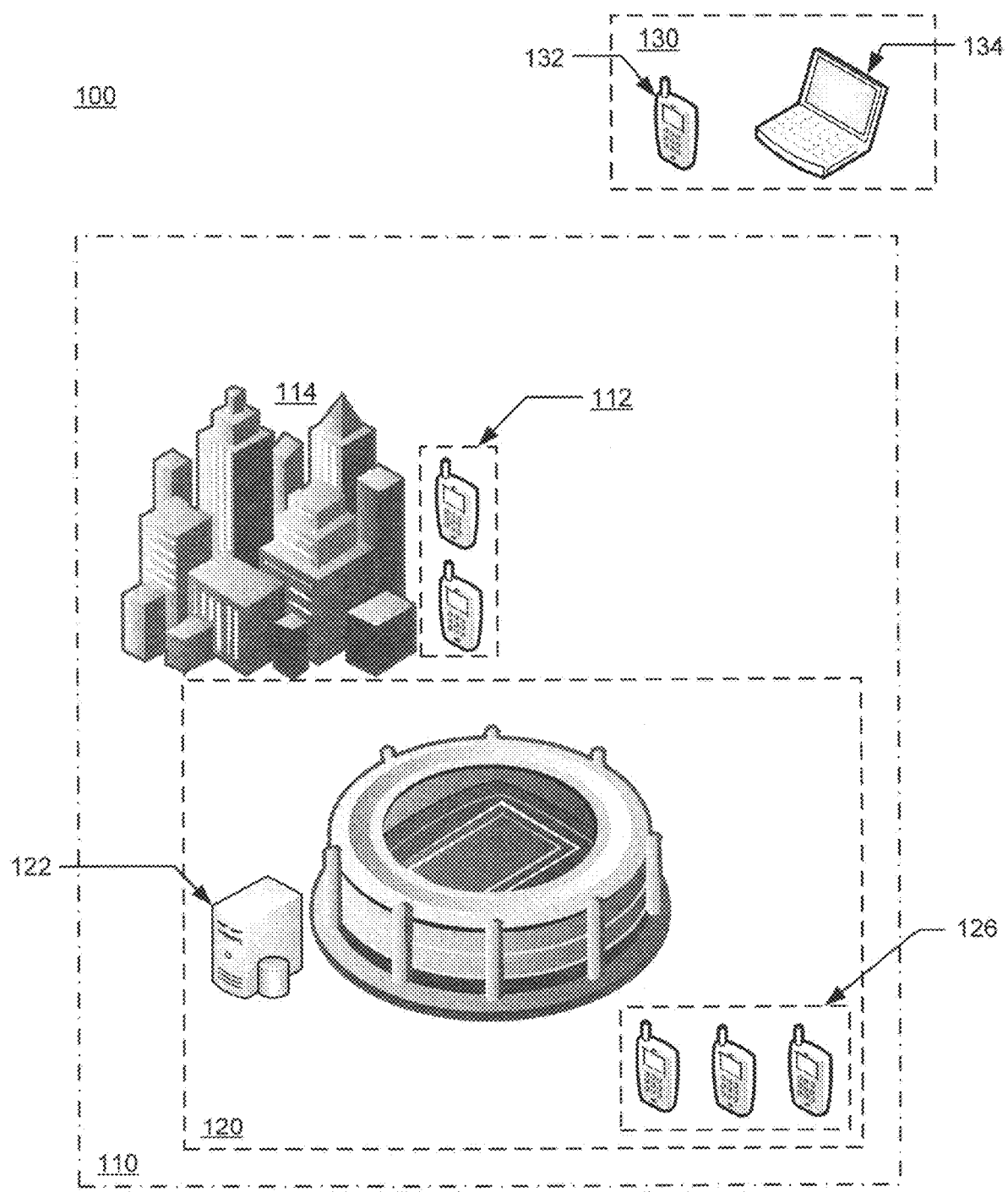
FIG. 1 illustrates an exemplary location-based network environment for during event peer-to-peer ticket exchange according to aspects of the disclosure.

The present invention is further described in the detailed description that follows.

DETAILED DESCRIPTION

Going forward, various aspects of the venue management system and process for during event peer-to-peer ticket exchange of the present disclosure may be illustrated by describing components that are in communication, or part of a network, or are coupled, attached, and/or joined together. As used herein, the terms "connected", "in communication", "coupled", "attached", and/or "joined" are used to indicate either a direct connection between two components or, where appropriate, an indirect connection to one another through intervening or intermediate components. In contrast, when a component is referred to as being "directly connected", "directly attached", and/or "directly joined" to another component, there are no intervening elements present.

Various aspects of the venue management system and process may be illustrated with reference to one or more exemplary embodiments. As used herein, the term "exemplary" means "serving as an example, instance, or illustration," and should not necessarily be construed as preferred or advantageous over other embodiments of the venue management system and processes disclosed herein.

Glossary

In this description and claims directed to the disclosure, various terms may be used for which the following definitions will apply:

"Dynamic acceptable range" as used herein may refer to a subscribing partner's location range which decreases proportionally to the event's remaining time. For example, an acceptable range may be 2 miles when there is an hour remaining of the event's time and 0.5 miles when there is 30 minutes left of event time.

"Event location data" as used herein may refer to geographical positioning system coordinates, or one or more registered local area network(s).

"Geofenced electronic ticket exchange" as used herein refers to a location-based electronic ticket exchange using GPS, RFID, a local area network, or cellular data to trigger the pre-programmed electronic ticket exchange when a wireless device enters a virtual boundary set up around a geographic location or location range. More particularly, the virtual boundary which may be at sections inside the venue, a perimeter around the venue, and/or location subscribing partners within a certain proximity from the venue. Subscribing partners can include restaurants, bars, or any other pre-approved location subscriber that is within a dynamic acceptable range.

"Membership", "group", or "rewards program" as used herein may refer to an entitlement to an additional seat exchange related benefit or participation in a seat exchange program itself. For example, the membership or rewards program may be one of a bank, such as, a credit card, and a group may be a classification, such as, students, first responders, or military.

"Peer-to-peer transaction" as used herein refers to the electronic exchange of a seat or access inside a venue during an event that is between one or more of: at least two or more attendees, the venue seat management system, a rewards/membership program administrator, and an event ticket retailer. In accordance with aspects of the disclosure, the peer-to-peer transaction takes place during an event as opposed to before the event's start time.

"Seat exchange" as used herein refers to the purchase or redemption of a seat or private section access for a ticketed event with assigned seats or sections occurring after the start time of the event.

"Venue inventory" as used herein may refer to a seat or attendance inventory associated with an event.

Referring now to FIG. 1, an exemplary location-based network environment 100 for during event peer-to-peer ticket exchange according to aspects of the disclosure is shown. The location-based network 100 including a dynamic acceptable range 110 which encompasses the venue 120 and subscribing partners 114. Within the dynamic acceptable range 110 and the venue 120, computing devices, such as, wireless devices 112 and 126 of users are included. In addition, a venue's computing device 122 can be included to process or manage access to the venue and distribution of attendees in the venue.

Outside the dynamic acceptable range 130 there may be wireless devices 132 and 134 of other users, for example, subscriber users that, may be able to access the application with read only functionality or sell only functionality for those users that were unable to attend the event and sell their ticket prior to start time in conventional electronic ticket exchange applications.

Figure 2:
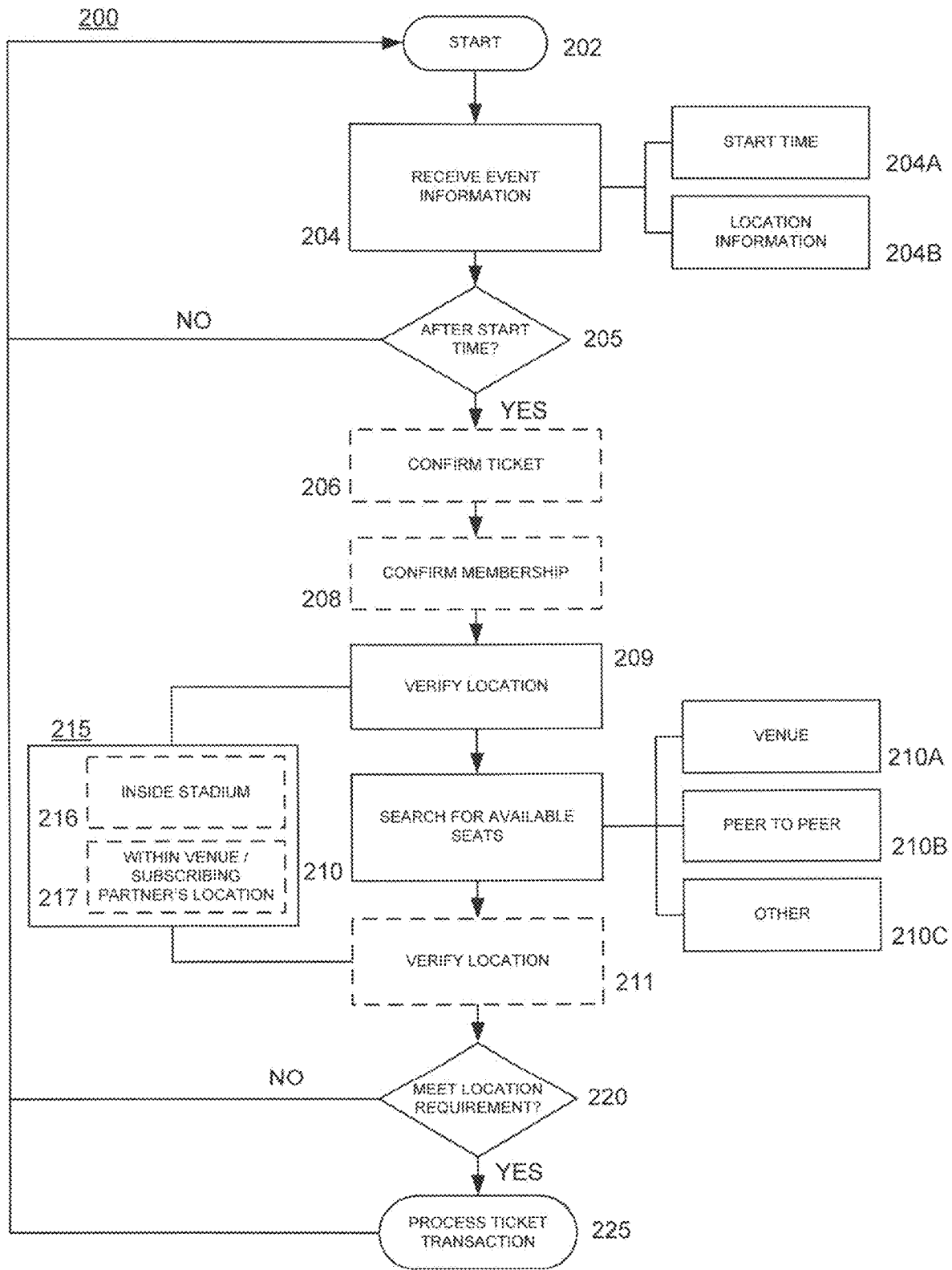
FIG. 2 is a flow diagram including exemplary method steps for during event venue electronic ticket processing according to various aspects of the disclosure.

Referring now to FIG. 2, a flow diagram 200 including exemplary method steps for during event venue electronic ticket processing according to various aspects of the disclosure is shown. Beginning at 202, a user may visit a website or access a wireless device's application ("App"). At the web site/App, the user inputs event information for the system to receive the event information 204 and retrieve date and start time of the event 204A and location information 204B. Location information 204B is not limited to venue specific information, but can also include a dynamic acceptable range that includes subscribing partners.

At 205, the website/App's system will confirm that the event has begun. If before or after event's duration, the application will not be enabled, and the user will be instructed to return during event. When the system confirms that the event has started 205 and it is such that the user has already purchased a ticket for the event or is inside of the venue, optionally, at least one of a user's ticket 206 and a membership 208 may be confirmed. At 209, the location of the user can be verified by retrieving the wireless device's location information 215 in order to ensure the user is either inside of the stadium 216, or within venue perimeter or at a subscribing partner's location 217. In accordance with some aspects, the subscribing partner's location acceptability is dynamic and will vary depending on remaining event's duration.

At 210, a search for available seats/access is determined. Available seats/access may be those unsold by the venue 210A or another 210C, such as, those blocked by a rewards/ membership offering entity. By way of non-limiting example, those rewards/membership offering entities can include event sponsors, stadium owners, and the like. In accordance with aspects of the disclosure, for a during event peer-to-peer transaction 210B, other available seats/access tickets may be those of other user attendees that are leaving early, never made it to the event, or they themselves bought an upgraded seat and their original seat becomes available. By enabling the re-selling of a ticket for a portion of the event (i.e. turning up each seat similarly to how a restaurant may be able to turn up tables during lunch/dinner hours), the venue and/or users are able to maximize attendance throughout the event. In addition, in some applications, users that change their seat location or leave the event can recover a portion of the ticket price paid.

Optionally at 211, the location(s) of one or both the buyer of a ticket and the seller may be verified by transmitting wireless device location information. Once the location requirement is met at 220, at 225, the ticket electronic ticket transaction can be processed. Certain aspects of the electronic ticket transaction will be described as illustrated in FIGS. 7A-7L and 8A-8H.

Figure 3:
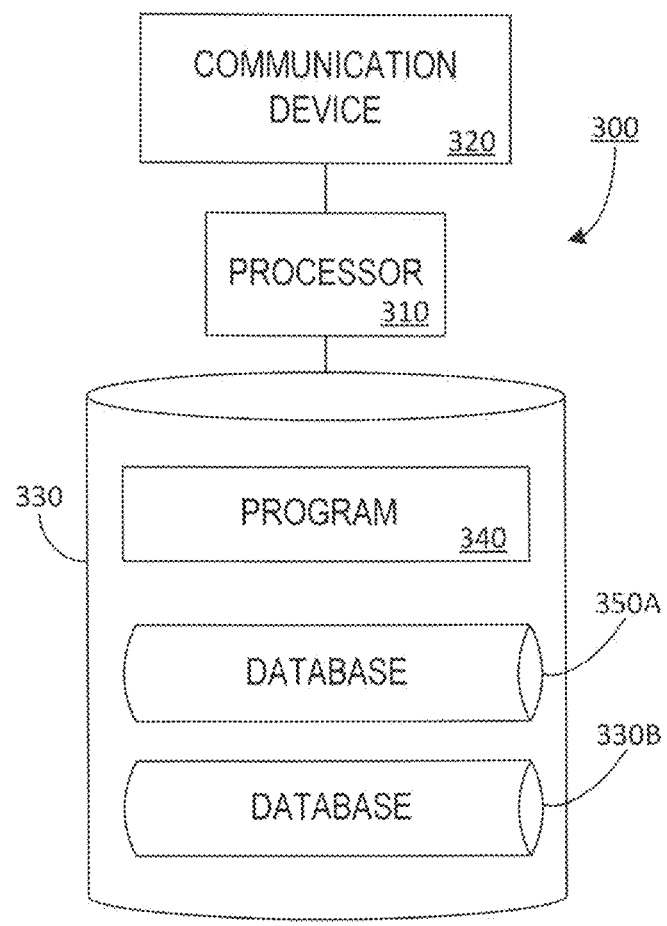
FIG. 3 illustrates a block diagram of a processor apparatus that may be used to implement various aspects of the disclosure.

Referring now to FIG. 3, a block diagram of a processor venue management system that may be used to implement various aspects of the disclosure is shown. A controller 300 that may be embodied in one or more systems of the venue and/or website/App owner may be used to implement some embodiments of the present disclosure. The controller 300 comprises a processor unit 310, such as one or more processors, coupled to a communication device 320 configured to communicate via a communication network (e.g., as shown in FIG. 1). The communication device 320 may be used to communicate, for example, with two or more, Bluetooth or network devices, such as, personal computers, wireless devices, computers, automobile, or a smart handheld or wearable device.

The processor 310 can also be in communication with a storage device 330. The storage device 330 may comprise any appropriate information storage device, including combinations of electronic storage devices, such as, for example, one or more of: hard disk drive, optical or magnetic storage devices, and semiconductor memory devices such as Random Access Memory (RAM) devices and Rea Only Memory (ROM) devices. The storage device 330 can store a program 340 for controlling the processor 310. The processor 310 performs instructions of the program 340, and thereby operates in accordance with the aspects of the disclosure. The processor 310 may also cause the communication device 320 to transmit information, including, in some instances, control commands to operate the processes described herein. Some specific examples of apparatus utilized to implement various aspects of the disclosure can include a computer server, a personal computer, a laptop computer, a handheld computer, an iPad, a wireless device (e.g. smartphone), or other communication device, or any other processor and display equipped device.

The program 340 may additionally be in communication with databases 350A and/or 350B, and other external databases (not shown) through the communication device 320. Databases may include, for example, seat inventory, event's statistics, weather, traffic, social network data corresponding to the user, crowd control information for safety, broadcasting network's preferences, membership/rewards program/ group verification data, and the like. In some embodiments, apparatus can be in communication with a video and data server farm. The video and data server farm may include at least one video/image representation associated with the venue and/or event. Transmission of such may be used by the venue to manage, encourage, or engage fan audience in accordance with certain aspects of the disclosure.

Figure 4:
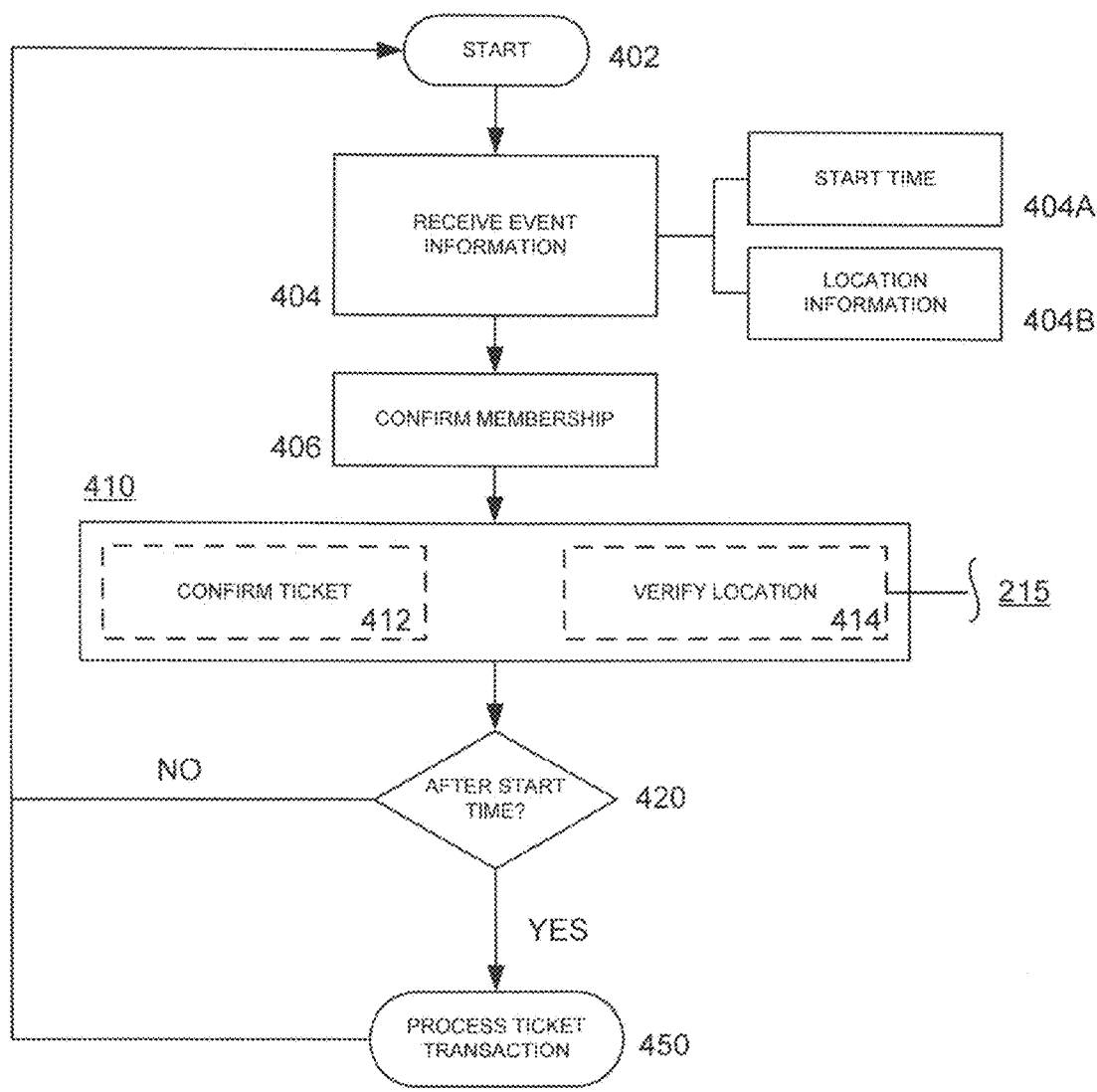
FIG. 4 is a flow diagram including exemplary method steps that may take place during event venue electronic ticket processing according to additional membership aspects of the disclosure.

Referring now to FIG. 4, a flow diagram including exemplary method steps that may take place during event venue electronic ticket processing according to additional membership aspects of the disclosure is shown. Beginning at 402, event information 404 is transmitted 404 to confirm a start time 404A and location 404B of an event. The event may include, for example, a concert, sporting event, presentation, and the like. At 406, a rewards program, a membership, or a group, of user can be confirmed. By way of nonlimiting examples, a rewards program may be that of the electronic ticket exchange App itself, a credit card points program and the like. A membership may include, for example, a credit card, a sports club, a social club, and/or a bank. A group may include, for example, veterans, teachers, students, and similar groups which the venue/sponsor may want to offer special benefits to.

At 410, at least one of an existing ticket 412 and location 414 may be confirmed. For example, as described herein with reference to 215 in FIG. 2. The determination that the event has begun 420 here is also needed before the upgraded ticket can be processed 450. In some embodiments, the electronic ticket issued by the membership provider may be access to a VIP area or upgraded seat, subject to rewards points earned, or the like. For example, different seats or VIP areas may be available to those that have used the App a number of times to upgrade their tickets, earning redeemable points.

Figure 5:
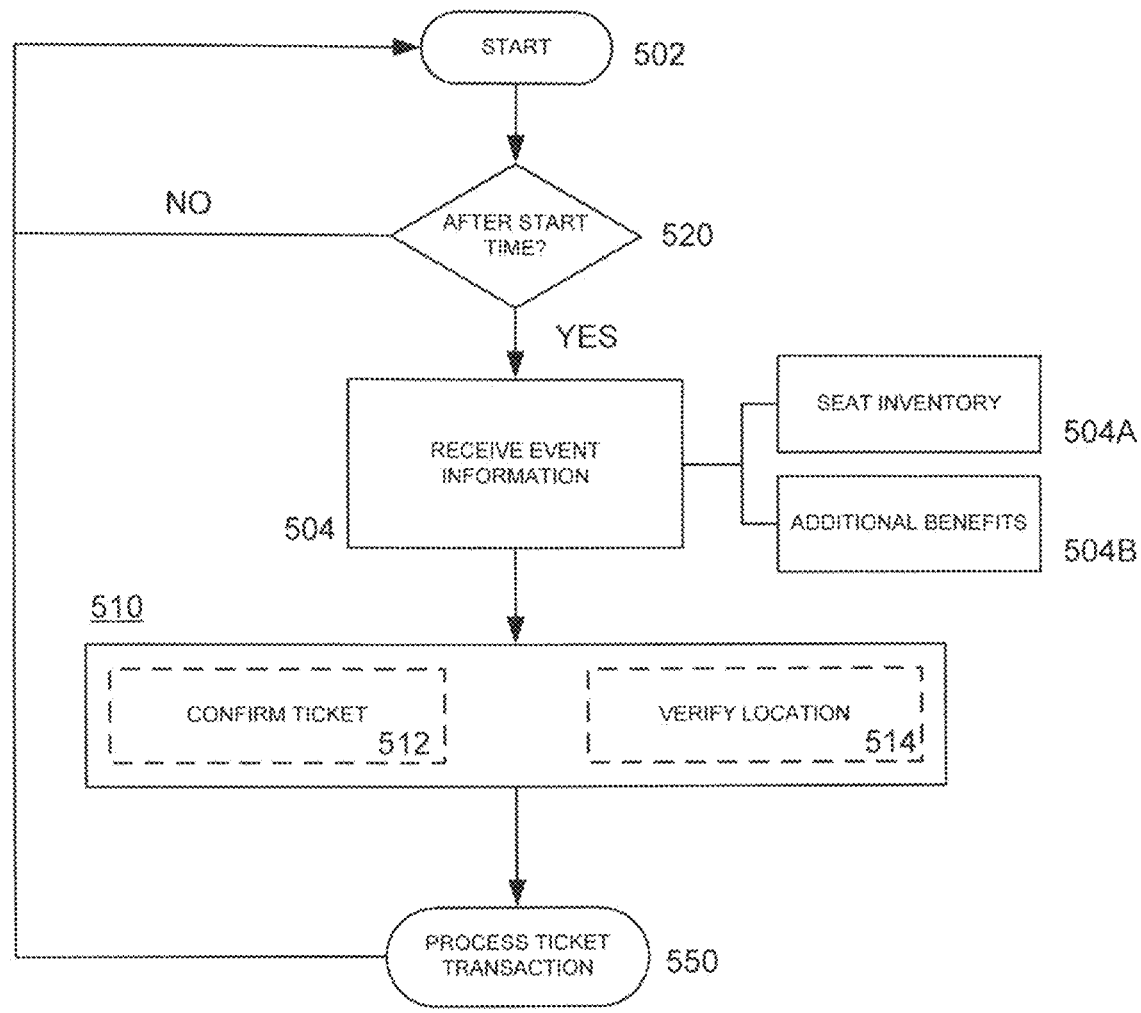
FIG. 5 is a flow diagram including exemplary method steps that may take place during event venue electronic ticket processing according to additional venue management aspects of the disclosure.

Referring now to FIG. 5, a flow diagram including exemplary method steps that may take place during event venue electronic ticket processing 500 according to additional venue management aspects of the disclosure is shown. Beginning at 502, the venue administrator may confirm that the request is taking place after the start time of the event 520. At 504 event confirmation, which may include seat inventory 504A, for example, unsold available seats, and/or additional benefits 504B, for example, restricted access available spots or prices, may be transmitted to the user for selection. At 510, one or both of the user's ticket admission 512 and location of the user 514 can be confirmed. In accordance with some aspects, by confirming an existing ticket admission 512, for example, a ticket purchased pre-event to access the venue, the selection provided to the user may be according to an upgrade or sell ticket preference. At 550, the user may obtain an electronic ticket upgrade or change that occurs post event start time and can come from the venue's unsold inventory or no shows after admission to the venue has closed.

Figure 6:
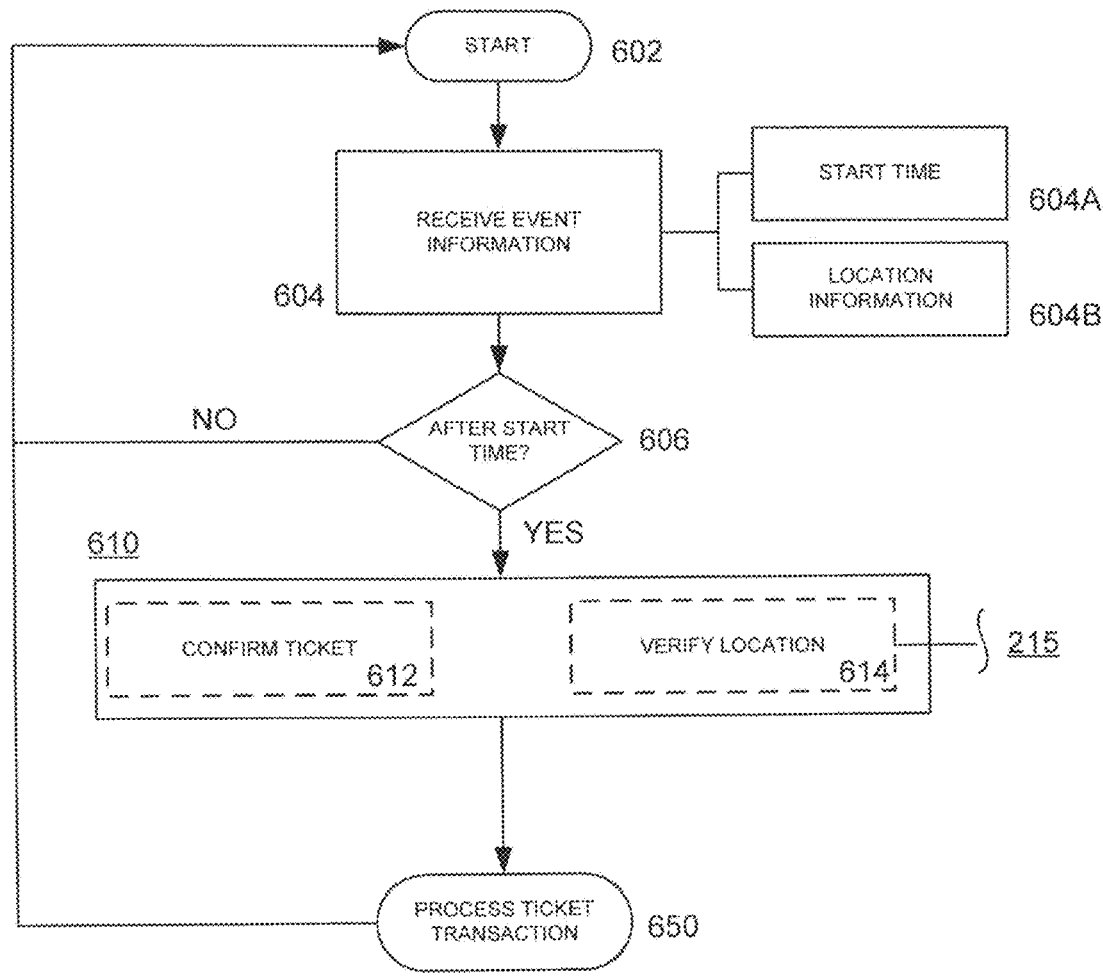
FIG. 6 is a flow diagram including exemplary method steps that may take place during event venue electronic ticket processing according to additional peer-to-peer ticket exchange aspects of the disclosure.

Referring now to FIG. 6, a flow diagram including exemplary method steps that may take place during event venue electronic ticket processing according to additional peer-to-peer ticket exchange aspects 600 of the disclosure is shown. Beginning at 602, the App or website can be prompted to receive event information at 604. Event information can include the event's start time 604A and location information 604B. Because of the peer-to-peer nature of the transaction, location information 604B can include data information about the venue, the buyer and multiple seller users that may be available. Location information may be event location but also includes a dynamic acceptable range that can be used to determine an acceptable location for the electronic ticket buyer using the App. At 606, a determination that the request has been made after start time of an event takes place for the system to then process data 610 relating to one or both an existing ticket 612 and a user's location 614. Aspects of the processing/verification may take place as described in reference to 215. After the information is transmitted, the management system can process the ticket transaction at 650.

In the system and method of the present disclosure, a variety of "user interfaces" may be utilized to allow a user to interface with the processing machine or machines that are used to implement the present disclosure. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

Figure 7C:
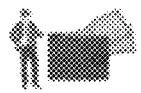
Figure 7C:
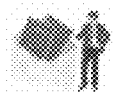
Figure 7D:
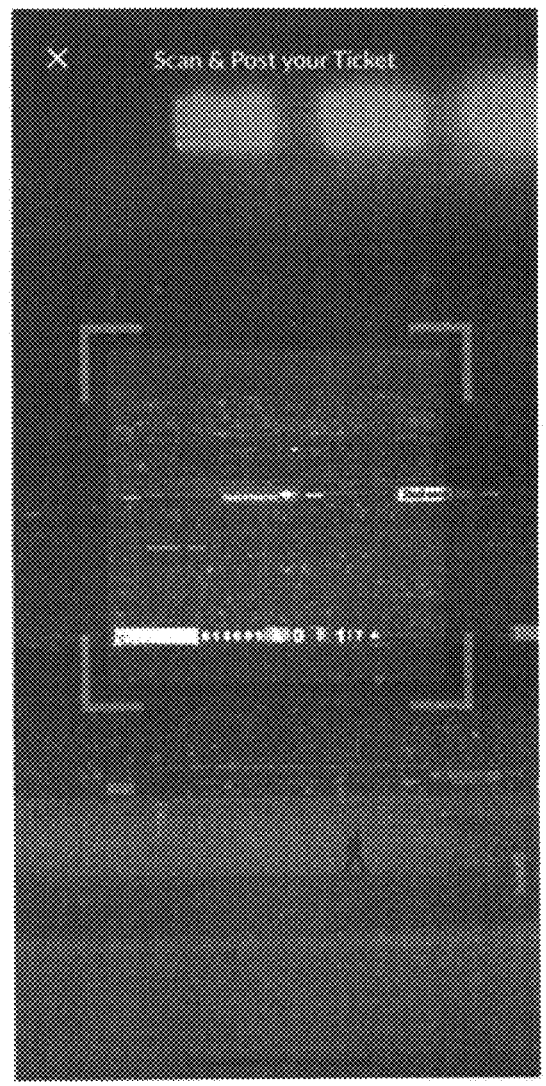
Figure 7E:
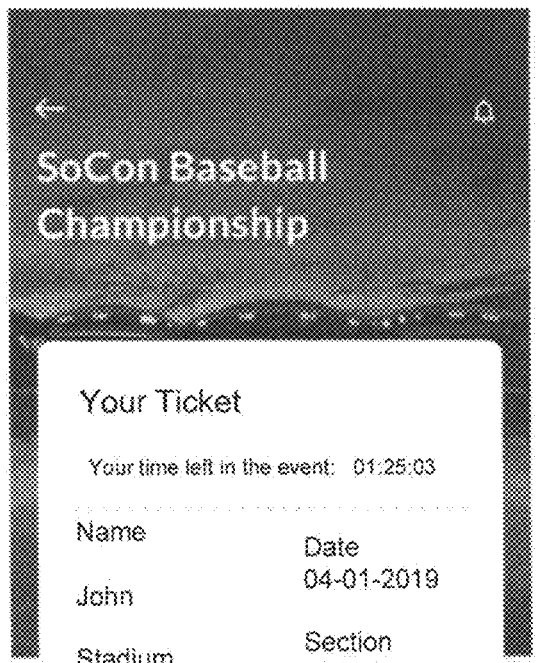
Figure 7F:
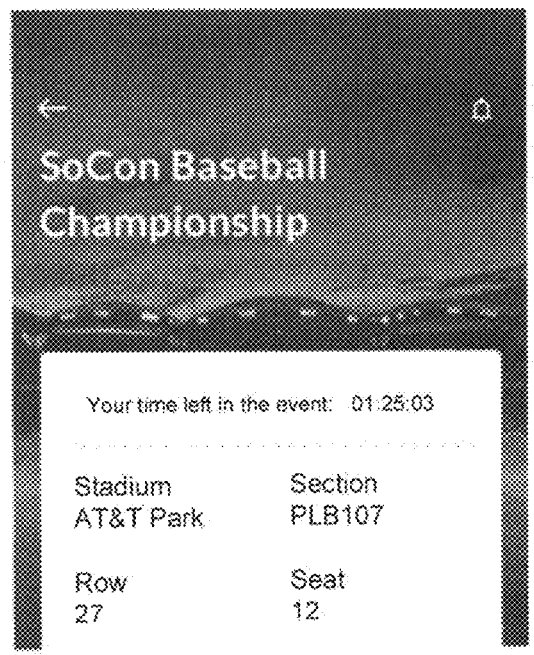

That said, in FIGS. 7A-7J, exemplary user interface displays for the peer-to-peer during event ticket purchase in accordance with aspects of the disclosure are illustrated. Beginning with FIG. 7A, a user may receive promotional messages about the App. and be prompted to allow the App. to access his/her location or enter the event's location. At FIG. 7B, the App. will confirm the location found/entered and provide event information for user's confirmation. After location and event information is transmitted by the user's device, the App. user is afforded the opportunity to buy or sell his/her electronic ticket 7C. As shown in FIG. 7D, the ticket information may be transmitted by scanning the ticket or by entering seat information. At FIG. 7E, from the beginning and ending time confirmation, the system displays the ticket information and event's remaining time. In some embodiments, as displayed in FIG. 7F, the user may be presented with a suggested price to sell his/her ticket to a user wanting to change his event experience. As previously disclosed, the suggested value for the seat exchange can be determined using the event's remaining time for the event using the beginning and ending time data can be determined. In addition, the determination may also include a live event update that is received in real time, such as, weather data, a broadcasting camera's location, an event's feedback or score, attendance data, crowd distribution, safety or evacuation procedures, and a news update or any other geosocial phenomena.

Figure 7G:
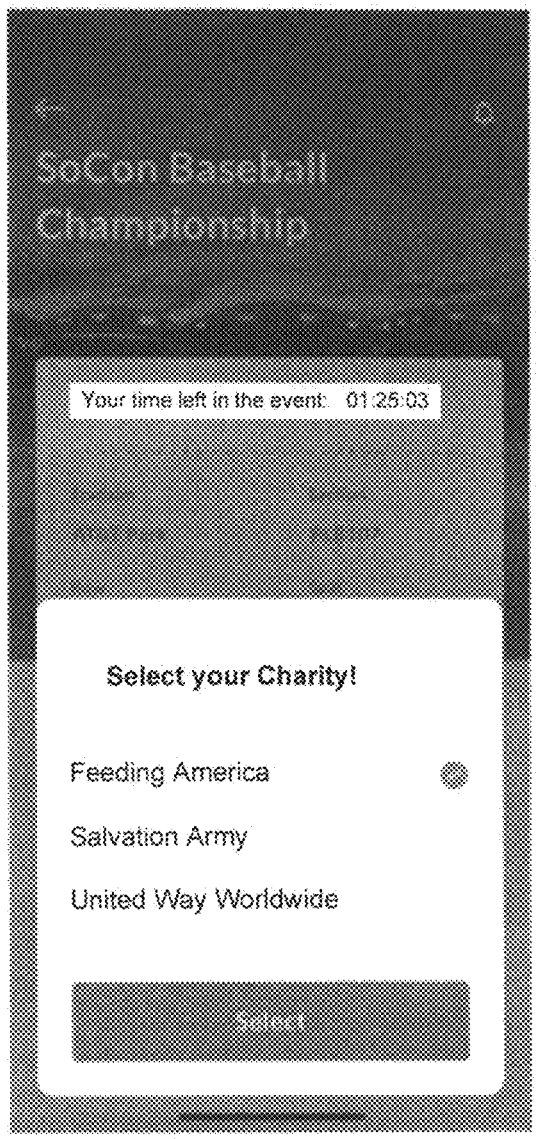
Figure 7H:
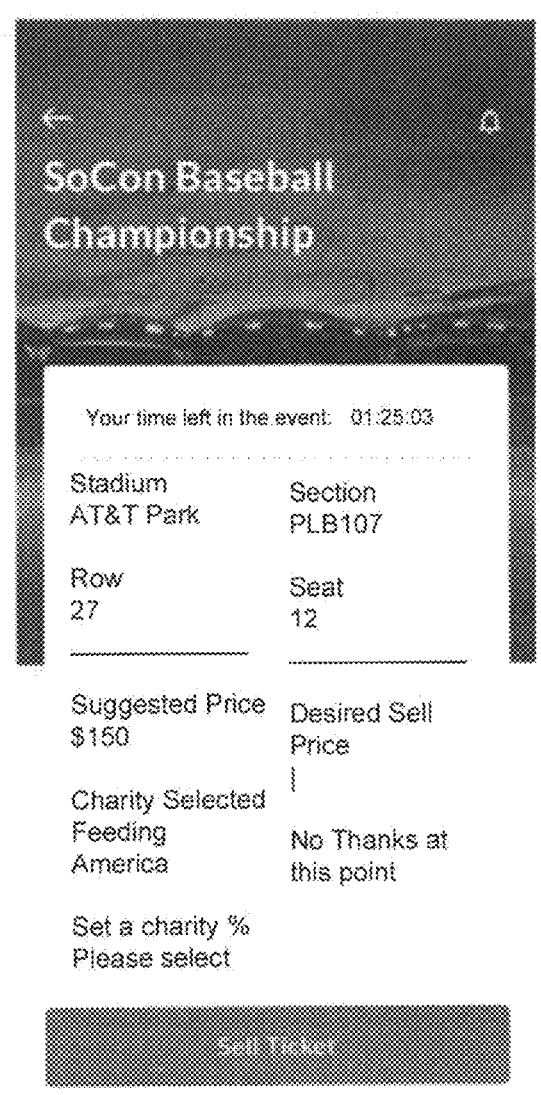
Figure 7I:
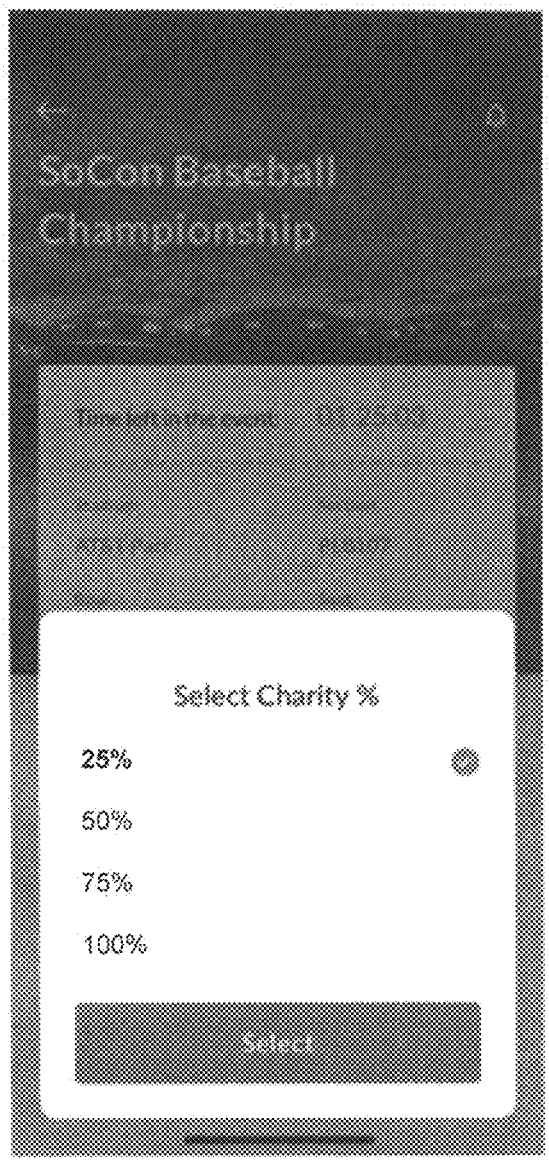
Figure 7J:
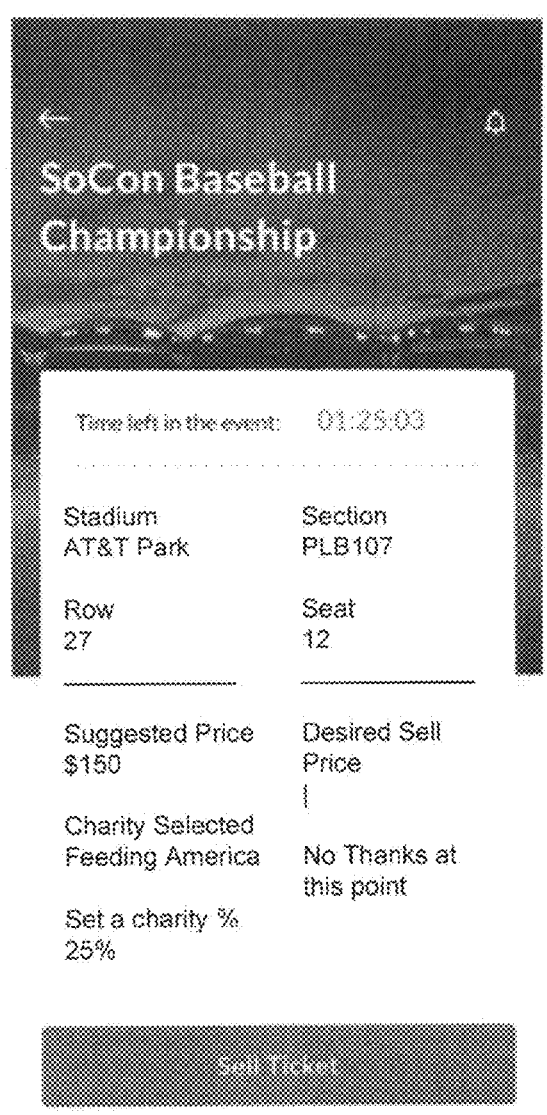
Figure 7K:
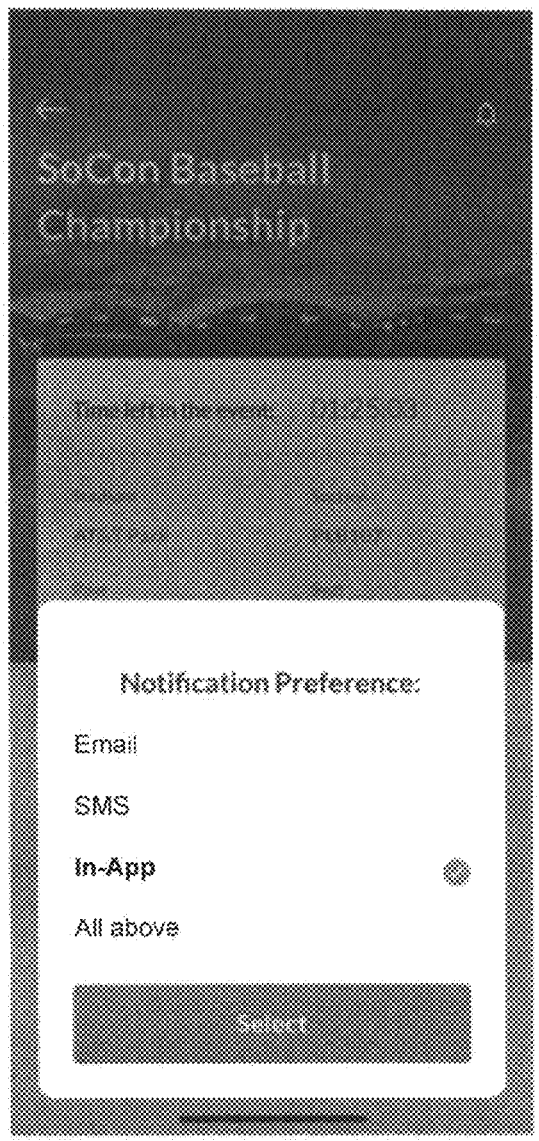
Figure 7L:
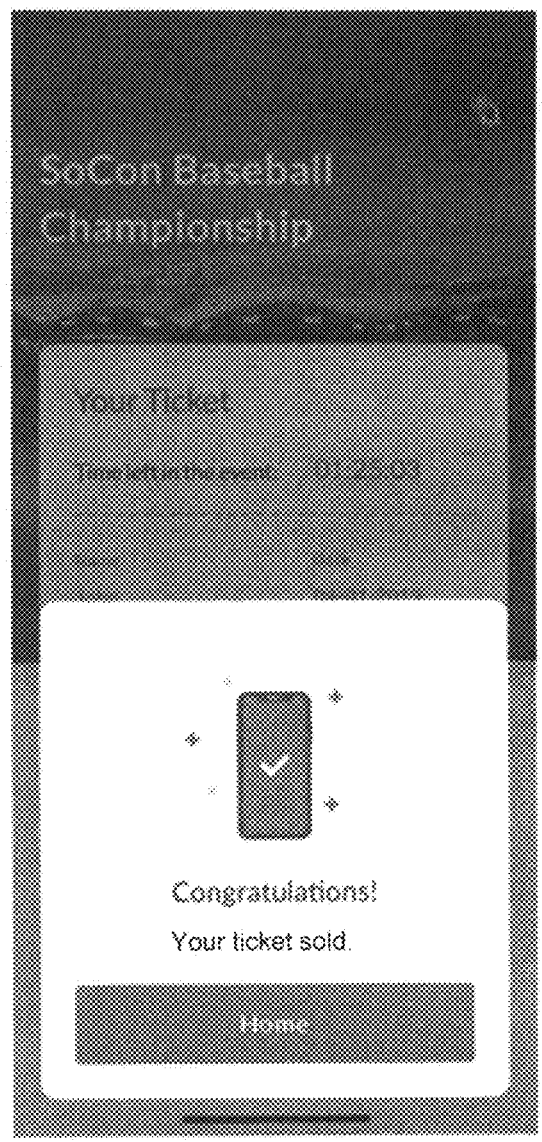

At FIG. 7G, the user may be provided to select a charity to donate all or a portion of the sale's price for his/her ticket and, at FIG. 7H, the listing price for the partial duration electronic ticket can be set by the user. As shown in FIG. 7H, the App. may provide the user with notification preferences. Notifications may include, for example, that the ticket sold as shown in FIG. 7J, or that additional seats have been released for the seller to buy, restricted access notifications, offers, and the like.

Figure 8A:
FIGS. 8A-8H illustrate exemplary user interface displays for the peer-to-peer during event ticket purchase in accordance with aspects of the disclosure.
Figure 8A:
Figure 8B:
Figure 8C:
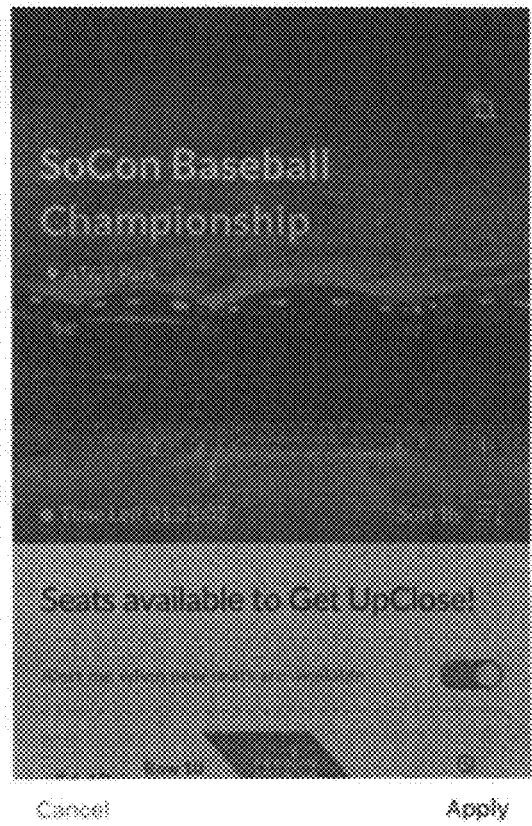
Figure 8D:
Figure 8E:
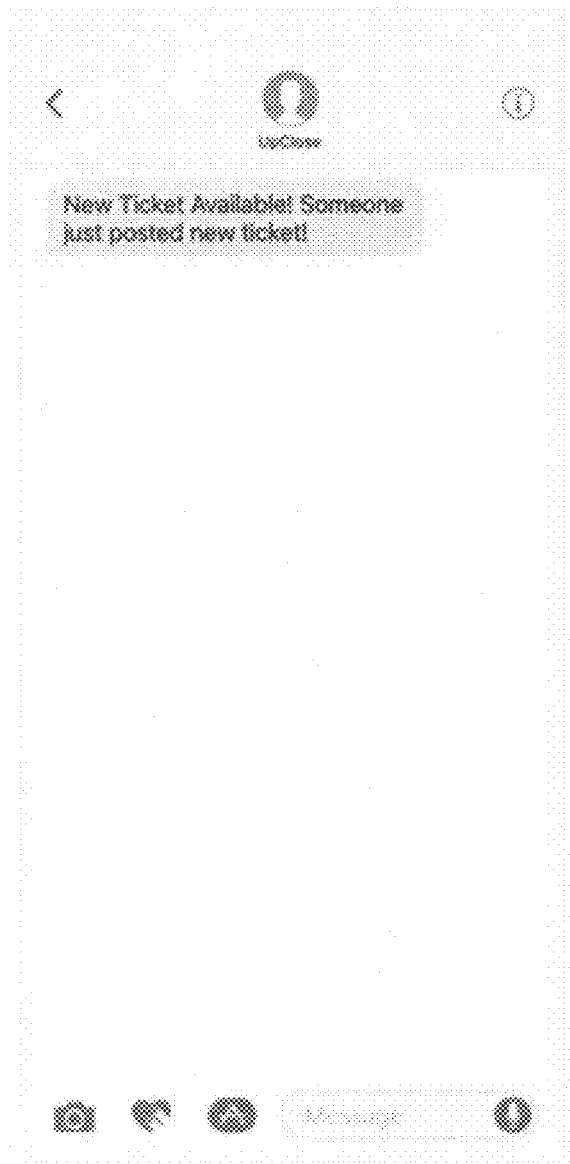
Figure 8F:
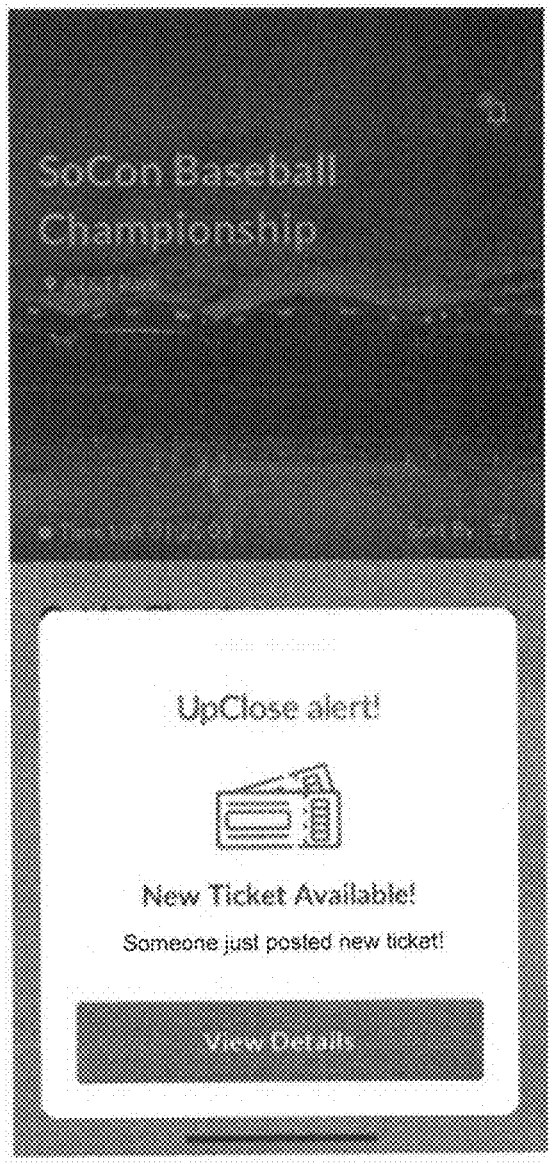
Figure 8G:
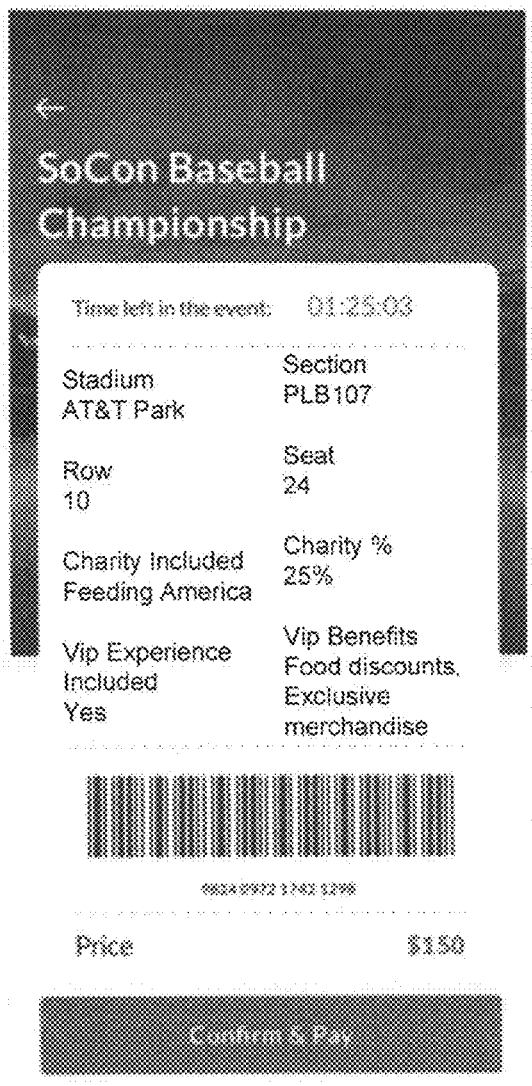
Figure 8H:
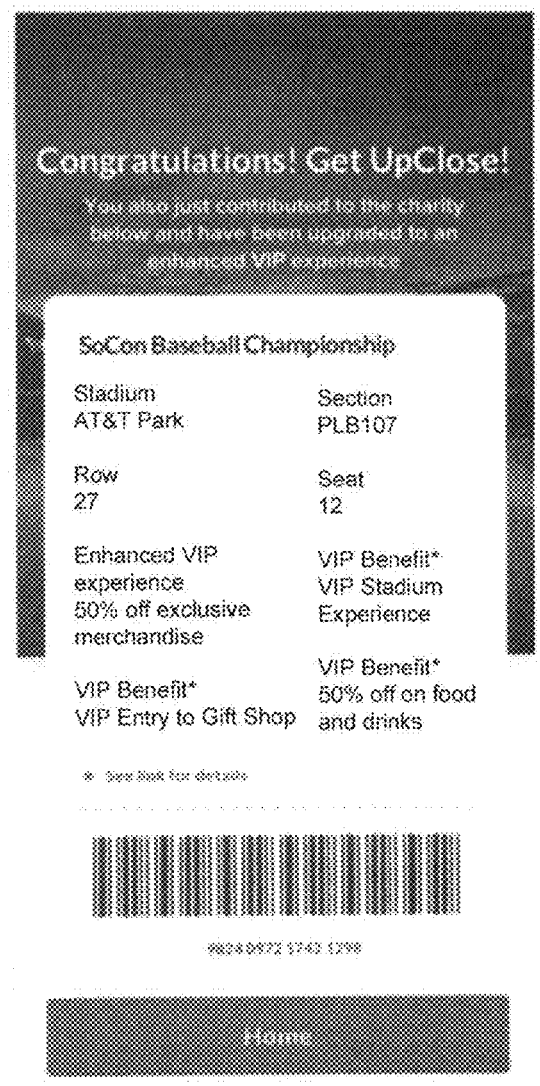

Referring now to FIGS. 8A-8H, exemplary user interface displays for the peer-to-peer during event ticket purchase in accordance with aspects of the disclosure are illustrated. Beginning at FIG. 8A, a user may receive promotional messages about the App. and be prompted to allow the App. to access his/her location or enter the event's location. As shown in FIG. 8A, if no events are found within the dynamic acceptable range, the App will notify the user that the App is not available until after start time of the event. As shown in FIG.*C, after the event has started, the App. can allow a ticketholder or a user within the dynamic acceptable range to view seats, charities, and offers offered by the App. At FIG. 8D, offered seats from other attendees or unsold seats can be offered to the buyer user for purchase for an opportunity to enhance his/her experience. At FIG. 8E, a sample SMS notification, in accordance with previously stored user preferences, is shown. This notification may direct the user to the App. to view details about the available ticket as shown in FIG. 8F.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as one skilled in the art would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law.

CONCLUSION

In accordance with aspects of the disclosure, as described above and as further defined by the claims below, by enabling during event, peer-to-peer, location based seat or access exchanges, a user may upgrade his/her experience according to his/her own preferences, while allowing the venue to increase its revenue and manage seating in accordance with preferences, broadcasting, safety, crowd control, and the like.

We claim:

1. A system for the management of a venue with a peer-to-peer ticket exchange for exchanging attendee seats after the beginning of an event, the system comprising:
a computing device having a processor, wherein the computing device is configured to communicate with a plurality of wireless devices, wherein at least some of plurality of wireless devices are from event attendees in possession of a seat and inquiring to exchange their seat after the beginning time of the event;
the computing device configured to communicate with a plurality of local area networks within a pre-determined geofenced location area, wherein at least some of the plurality of local area networks are from subscriber partners outside of the perimeter of the venue;
the computing device configured to communicate with a venue's seat inventory system; and
executable software code executed by the processor of the computing device for:
transmitting the event beginning and ending time data,
transmitting the event location data and the pre-determined geofenced location area, wherein the pre-determined geofenced location area has a dynamic acceptable range determined by the event's remaining time, and processing a peer-to-peer transaction of a seat exchange from one or more of the attendees in possession of a seat at a time in between the transmitted beginning and ending time data, wherein the peer-to-peer transaction for the seat exchange comprises:
a verification including transmitting a location of one or more of the plurality of wireless devices using one of the plurality of the local area networks from subscriber partners outside of the venue within the pre-determined geofenced location area, and the verification additionally includes confirming that the location of the one or more of the plurality of wireless devices is within the pre-determined geofenced location area at a time of the peer-to-peer transaction of the seat exchange from the one or more of the attendees in possession of a seat is processed.

2. The system of claim 1, wherein the peer-to-peer transaction for the seat exchange additionally comprises at least one of a ticket verification and a membership verification.

3. The system of claim 2, wherein a location range is used for the location verification of the one or more of the plurality of smart phone devices.

4. The system of claim 3, wherein the pre-determined geofenced location area is verified by the use of a global positioning system of one of the plurality of the smart phone devices.

5. The system of claim 1, wherein the system is configured to enable a view mode only to the seat inventory for any computing devices outside of the pre-determined geofenced area.

6. The system of claim 1, wherein the computing devices is configured to determine a suggested value for the peer-to-peer seat exchange by determining an event's remaining time for the event using the transmitted beginning and ending time data.

7. The system of claim 6, wherein the computing device is configured to receive an event live update.

8. The system of claim 7, wherein the event live update includes one or more of: weather data, a broadcasting camera's location, an event's feedback or score, attendance data, crowd distribution, safety or evacuation procedures, and a news update.

9. A method for managing a venue with a peer-to-peer ticket exchange for exchanging attendee seats after the beginning of an event, the method comprising the steps of:
transmitting, by a computing device, an event beginning and ending time data,
transmitting, by the computing device, the event location data and the pre-determined geofenced location area, wherein the computing device communicates with 1) a plurality of smart phone devices of which some are from event attendees in possession of a seat and inquiring to exchange their seat after the beginning time of the event, 2) a plurality of local area networks within a pre-determined geofenced location area and 3) a venue's seat inventory system, wherein at least some of the plurality of local area networks are from subscriber partners outside of the perimeter of the venue, wherein the pre-determined geofenced location area has a dynamic acceptable range determined by the event's remaining time, and
processing, by the computing device, a peer-to-peer transaction of a seat exchange from one or more of the attendees in possession of a seat at a time in between the transmitted beginning and ending time data, wherein the peer-to-peer transaction for the seat exchange comprises:
a verification including transmitting a location of one or more of the plurality of smart phone devices using one of the plurality of the local area networks from subscriber partners outside of the venue within the pre-determined geofenced location area, and
the verification additionally includes confirming that the location of the one or more of the plurality of smart phone devices is within the pre-determined geofenced location area at a time of the peer-to-peer transaction of the seat exchange from the one or more of the attendees in possession of a seat is processed.

10. The method of claim 9, wherein a location range is used for the verifying of the location of the one or more of the plurality of smart phone devices.

11. The method of claim 10, wherein the location range is determined by the use of a global positioning system of one of the plurality of the smart phone devices.

12. The method of claim 10, additionally comprising:
   blocking access to the seat inventory for any smart phone devices outside of the location range.

13. The method of claim 9, additionally comprising:
   determining a suggested value for the peer-to-peer transaction for the seat exchange by determining remaining time for the event using the beginning and ending time data.

14. The method of claim 13, additionally comprising: receiving an event live update.

15. The method of claim 14, wherein the event live update includes one or more of: weather data, a broadcasting camera's location, an event's feedback or score, attendance data, and a news update.

\* \* \* \* \*